United States Patent
Hu et al.

(10) Patent No.: US 10,705,327 B2
(45) Date of Patent: Jul. 7, 2020

(54) LIGHT EMITTING METHOD AND LIGHT EMITTING DEVICE

(71) Applicant: INDUSTRIAL TECHNOLOGY RESEARCH INSTITUTE, Hsinchu (TW)

(72) Inventors: Pin-Hao Hu, Hsinchu (TW); Shao-Chuan Lu, Hsinchu (TW); Hsuan-Chang Lee, Hsinchu (TW); Po-Huan Chou, Hsinchu (TW); Min-Kai Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 313 days.

(21) Appl. No.: 15/860,152

(22) Filed: Jan. 2, 2018

(65) Prior Publication Data
US 2019/0204584 A1 Jul. 4, 2019

(51) Int. Cl.
*G02B 26/08* (2006.01)
*G02B 27/40* (2006.01)
(Continued)

(52) U.S. Cl.
CPC ........ *G02B 26/0816* (2013.01); *B23K 26/035* (2015.10); *B23K 26/067* (2013.01);
(Continued)

(58) Field of Classification Search
CPC .. G02B 26/0816; G02B 27/286; G02B 27/14; G02B 27/40; G02B 26/10; G02B 27/0927; G02B 27/283; B23K 26/08; B23K 26/389; B23K 26/40; B23K 26/384; B23K 26/0648; B23K 26/402; B23K 26/067; B23K 26/0643; B23K 26/035; B23K 2103/00; B23K 2103/42; B23K 2103/54; B23K 2101/42; B23K 2101/001; B23K 2103/52
See application file for complete search history.

(56) References Cited

U.S. PATENT DOCUMENTS 5,037,183 A 8/1991 Gagosz et al.
5,973,290 A 10/1999 Noddin
(Continued)

FOREIGN PATENT DOCUMENTS

CN 204308417 U 5/2015
CN 105607248 A 5/2016
(Continued)

OTHER PUBLICATIONS

Zhu et al., Double-shearing interferometer for accuratetest of laser wavefront, Proc. of SPIE vol. 5160, Jan. 2, 2004, pp. 390-396.
(Continued)

*Primary Examiner* — Euncha P Cherry
(74) *Attorney, Agent, or Firm* — Rabin & Berdo, P.C.

(57) ABSTRACT

A light emitting method includes passing a laser beam through at least one offset assembly and a focusing assembly in sequence, and actuating, by a control-manipulating mechanism, the offset assembly to cause the laser beam to be offset, so that the laser beam can quickly produce a controllable opening of any shape in a drilling process.

16 Claims, 5 Drawing Sheets

(51) Int. Cl.

| | | |
|---|---|---|
| *G02B 27/14* | (2006.01) | |
| *B23K 26/035* | (2014.01) | |
| *B23K 26/06* | (2014.01) | |
| *B23K 26/067* | (2006.01) | |
| *G02B 27/28* | (2006.01) | |
| *B23K 26/402* | (2014.01) | |
| *B23K 26/384* | (2014.01) | |
| *B23K 26/40* | (2014.01) | |
| *B23K 26/382* | (2014.01) | |
| *B23K 26/082* | (2014.01) | |
| *G02B 26/10* | (2006.01) | |
| *B23K 103/00* | (2006.01) | |
| *B23K 101/00* | (2006.01) | |
| *B23K 101/42* | (2006.01) | |

(52) U.S. Cl.
CPC ...... *B23K 26/0643* (2013.01); *B23K 26/0648* (2013.01); *B23K 26/082* (2015.10); *B23K 26/384* (2015.10); *B23K 26/389* (2015.10); *B23K 26/40* (2013.01); *B23K 26/402* (2013.01); *G02B 27/14* (2013.01); *G02B 27/286* (2013.01); *G02B 27/40* (2013.01); *B23K 2101/001* (2018.08); *B23K 2101/42* (2018.08); *B23K 2103/00* (2018.08); *B23K 2103/42* (2018.08); *B23K 2103/52* (2018.08); *B23K 2103/54* (2018.08); *G02B 26/10* (2013.01)

(56) References Cited

U.S. PATENT DOCUMENTS

| | | |
|---|---|---|
| 6,359,255 B1 | 3/2002 | Yamamoto et al. |
| 6,531,678 B2 | 3/2003 | Yamamoto |
| 7,371,596 B2 | 5/2008 | Warner, Jr. et al. |
| 7,880,117 B2 | 2/2011 | Li et al. |
| 2009/0079993 A1* | 3/2009 | Yatagai ............... A61B 5/0062 356/497 |
| 2011/0132881 A1 | 6/2011 | Liu |
| 2013/0258332 A1* | 10/2013 | Iga ........................... G01J 3/06 356/301 |
| 2017/0157705 A1 | 6/2017 | Muenzer et al. |

FOREIGN PATENT DOCUMENTS

| | | |
|---|---|---|
| CN | 105683808 A | 6/2016 |
| DE | 102004053298 B4 | 3/2006 |
| TW | I459039 | 11/2014 |
| TW | 201733730 A | 10/2017 |
| WO | WO-2016206943 A1 | 12/2016 |

OTHER PUBLICATIONS

Jahns et al., Laser trepanning of stainless steel, Lasers in Manufacturing Conference 2013, Physics Procedia 41, 2013, pp. 630-635.

Ashkenasi et al., Advanced laser micro machining using a novel trepanning system, JLMN—Journal of Laser Micro/Nanoengineering vol. 6, No. 1 2011, pp. 1-5.

Ashkenasi et al., Laser Trepanning for Industrial Applications, Physics Procedia 12, 2011, pp. 323-331.

Fornaroli et al., Laser-beam helical drilling of high quality micro holes, Lasers in Manufacturing Conference 2013, Physics Procedia 41, 2013, pp. 661-669.

1st Office Action of Taiwan Intelligent Patent Office, dated Nov. 19, 2019.

* cited by examiner

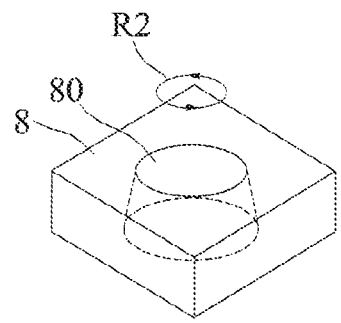 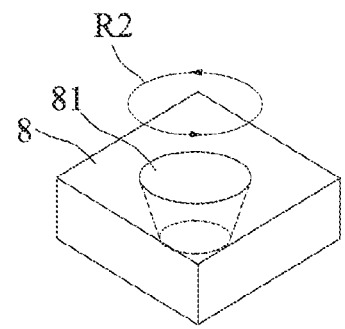
FIG. 2A        FIG. 2B
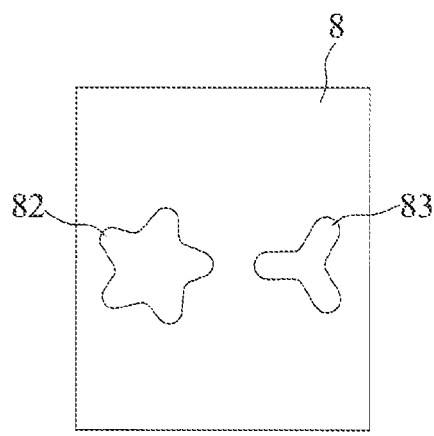 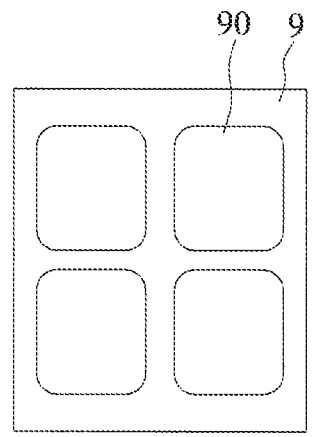
FIG. 2C        FIG. 2D

LIGHT EMITTING METHOD AND LIGHT EMITTING DEVICE

BACKGROUND

1. Technical Field

The present disclosure relates to a light emitting method and a device thereof, and more particularly, to a method for adjusting the path of an output light and a device thereof.

2. Description of Related Art

Laser microporous processing technology has been widely used in many industries, such as in the manufacturing of probe cards used in semiconductor process testing, transparent hard and brittle materials, engine injection holes and other processes such as metal cutting. However, the micropores produced by the existing laser processing equipment are conical circular holes. Therefore, it is necessary to incorporate a drilling module with the ability to control taper angles so as to generate micropores of different shapes to accommodate different requirements, such as in the areas of rectangular microporous processing of probe cards and the processing of straight holes of reinforced glass and tapered holes in engine nozzles.

However, the laser processing equipment is often limited by the diffraction characteristics of the laser beam, and the taper angles of the micropores cannot be adjusted as desired, resulting in the drilling module not having flexible machining capability for taper angles. It fails to address the need for manufacturing straight through holes and tapered holes in a single laser drilling process, for example, in a situation where the inclination of the edge of a rectangular hole is different from the inclination at the corner.

Furthermore, in the prior art, a glass plate or a prism-type trepanning module is rotated by a hollow motor, but only circular path offsets can be achieved, and the rotational speed of the hollow motor is low (less than 4,000 rpm), resulting in low throughput. This fails to meet the need for high speed in the manufacturing process of rectangular tapered holes and other hole-forming processes and the need for a controllable offset path. It also limits the drilling dimensions, for example, it is not possible to manufacture holes smaller than 50 microns ($\mu$m) in diameter.

Therefore, there is a need for a solution that addresses the aforementioned issues in the prior art.

SUMMARY OF THE DISCLOSURE

The present disclosure provides a light emitting method, which may include: passing a light beam through at least one offset assembly and a focusing assembly in sequence; and actuating, by a control-manipulating mechanism, the offset assembly to offset the light beam, wherein a programmable logic controller (PLC) of the control-manipulating mechanism plans a displacement path of the offset assembly to displace the offset assembly and control an offset path of the light beam.

The present disclosure further provides a light emitting device, which may include: an offset assembly for a light beam to pass therethrough; a focusing assembly for receiving the light beam from the offset assembly; and a control-manipulating mechanism for actuating the offset assembly to offset the light beam, wherein a programmable logic controller (PLC) of the control-manipulating mechanism plans a displacement path of the offset assembly to displace the offset assembly and control an offset path of the light beam.

In an embodiment, the displacement path of the offset assembly includes a moving distance variation or a rotational angle variation.

In an embodiment, the light emitting device is a laser device, and the light beam is laser.

In an embodiment, the light beam is offset in a parallel manner.

In an embodiment, the light beam is used for forming an opening. In another embodiment, the PLC plans the displacement path of the offset assembly based on a moving distance of the light beam and an inclination angle of a wall of the opening.

In an embodiment, the offset assembly may include: a beam splitter; a wave plate provided above the beam splitter; and a reflecting mirror provided above the wave plate, wherein the light beam is incident on and reflected by the beam splitter, passes through the wave plate, is reflected by the reflecting mirror, passes through the wave plate once again, and is reflected and outputted by the beam splitter.

In an embodiment, the control-manipulating mechanism includes a galvo motor to rotate the offset assembly by an offset angle that relates to an offset distance of the light beam.

In an embodiment, the light beam passes through two sets of the offset assemblies, one of which is used for offsetting the light beam in an X-direction, and the other of which is used for offsetting the light beam in a Y-direction perpendicular to the X-direction.

In an embodiment, the light emitting method may further include guiding, by a scanning assembly, the light beam from the offset assembly to the focusing assembly. In another embodiment, the scanning assembly and the PLC are used for controlling the offset path of the light beam. The offset path may be a circular, square, triangular, polygonal or curved path to be used in a laser manufacturing process of complicated parts.

BRIEF DESCRIPTION OF THE DRAWINGS

FIGS. 2A and 2B are schematic diagrams depicting other implementations of path planning for the light beam in FIG. 1;

FIGS. 2C and 2D are schematic diagrams depicting other implementations of the shape of the opening in FIG. 1;

DETAILED DESCRIPTION

Figure 1:
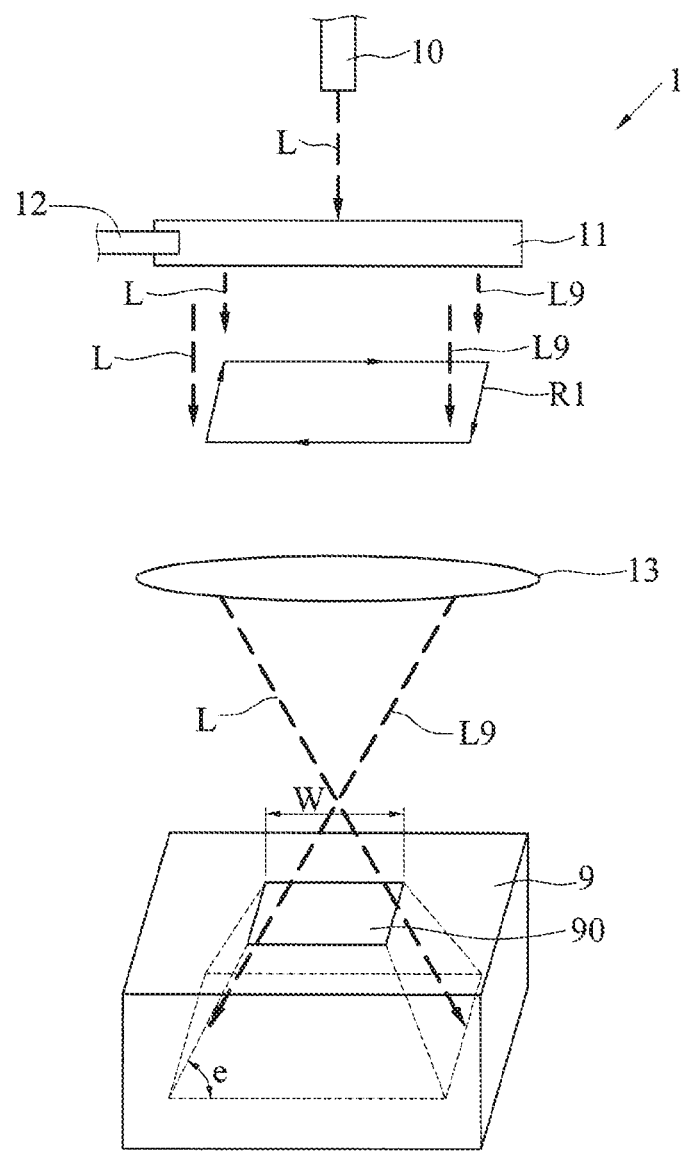
FIG. 1 is a schematic diagram depicting a light emitting device in accordance with a first embodiment of the present disclosure.

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

It should be noted that the structures, ratios, sizes shown in the drawings appended to this specification are to be construed in conjunction with the disclosure of this specification in order to facilitate understanding of those skilled in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "above", "below", "first", "second", "one", "a", "an", and the like, are for illustrative purposes only, and are not meant to limit the range implementable by the present disclosure. Any changes or adjustments made to their relative relationships, without modifying the substantial technical contents, are also to be construed as within the range implementable by the present disclosure.

Referring to FIG. 1, a schematic diagram depicting a light emitting device 1 in accordance with a first embodiment of the present disclosure is shown. The light emitting device 1 is modularized, including an offset assembly 11, a control-manipulating mechanism 12 and a focusing assembly 13.

The offset assembly 11 includes a spectroscope.

The control-manipulating mechanism 12 is used for actuating the offset assembly 11, and includes a galvo motor. The control-manipulating mechanism 12 uses a programmable logic controller (PLC) to plan a displacement path of the offset assembly 11 (e.g., a rectangular path R1 shown in FIG. 1), and uses the galvo motor to drive the offset assembly. The PLC makes the plan based on the moving distance of a light beam (e.g., a long side W of an opening 90 for guiding a probe on a probe card 9) and the inclination angle of the wall of the opening (i.e., the inclination e of a tapered surface of the opening 90). In other words, the planning of the PLC is an association equation of the moving distance of the light beam and the inclination angle of the wall of the opening.

The focusing assembly 13 includes a focusing lens.

During operation, a light source 10 emits a light beam L, such as laser. The light beam L passes through the offset assembly 11 and the focusing assembly 13 and is focused on a target (e.g., the opening 90 of the probe card 9). The offset path (e.g., along the rectangular path R1 of FIG. 1) of the light beam L is adjusted by the offset assembly 11, which is driven by the control-manipulating mechanism 12 (resulting in the light beam L or a light beam L9 based on different offset paths).

Therefore, the light emitting device 1 according to the present disclosure uses the galvo motor and the PLC of the control-manipulating mechanism 12 to offset the offset assembly 11, such that the path of the light beam L can be planned according to needs (e.g., the rectangular path R1 shown in FIG. 1, or circular paths R2 shown in FIGS. 2A and 2B). As a result, the light emitting device 1 is capable of arbitrarily adjusting the taper angles of an opening (e.g., the inclination e at the long side W and the inclination e at the corner of the rectangular opening 90 are different), and thus holes of any shapes can be manufactured. For example, a circular tapered hole 80 and a circular tapered hole 81 of a target 8 are shown in FIGS. 2A and 2B, a star-shaped opening 82 and a Y-shaped opening 83 of the target 8 are shown in FIG. 2C, and a rectangular opening 90 with fillets of a probe card 9 is shown in FIG. 2D. The light emitting device 1 according to the present disclosure is especially useful for manufacturing holes with a diameter less than 50 microns (μm) (e.g., the rectangular opening 90 of the probe card 9).

Figure 3A:
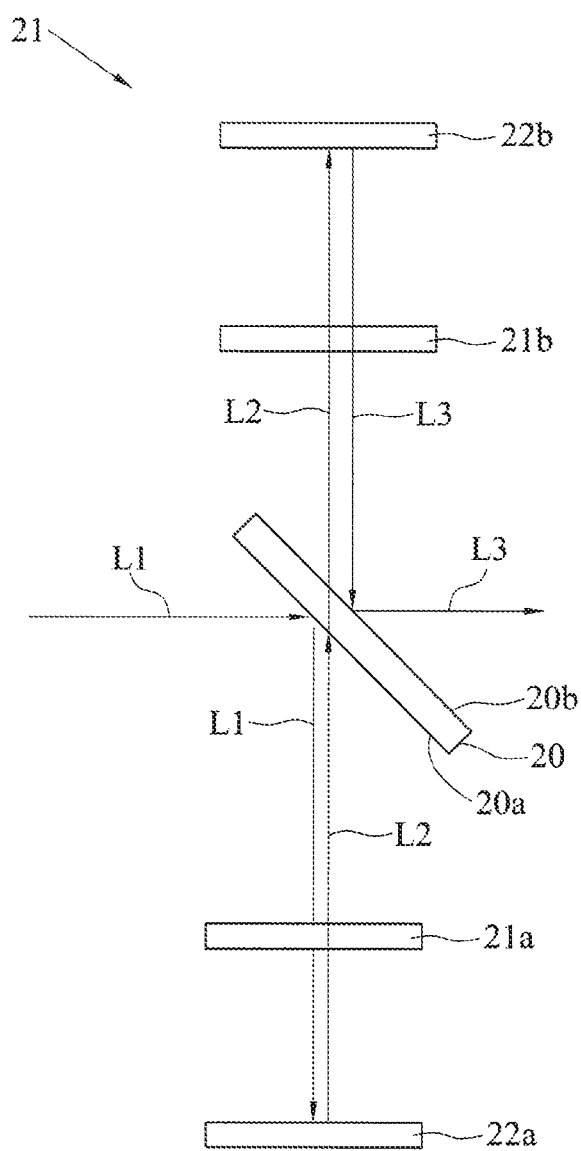
FIG. 3A is a schematic diagram depicting a portion of a light emitting device in accordance with a second embodiment of the present disclosure.
Figure 3B:
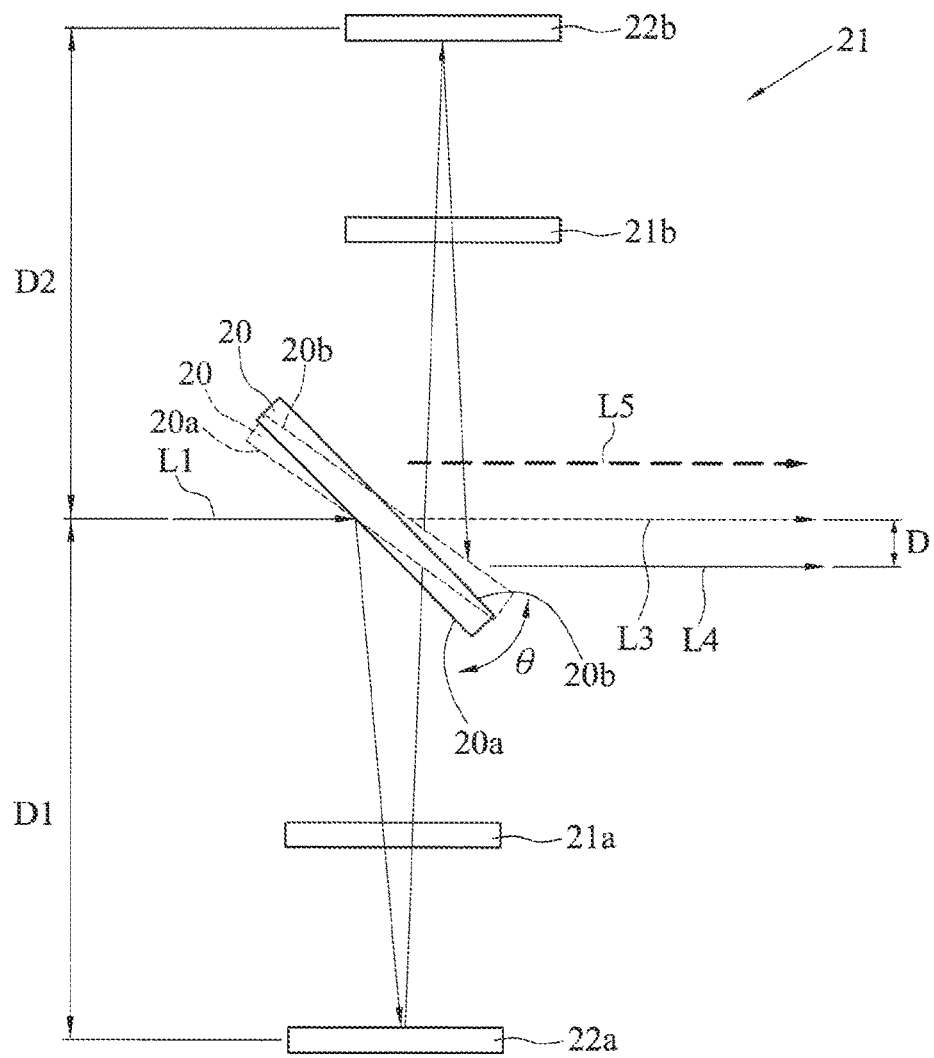
FIG. 3B is a schematic diagram depicting an offset state of the light beam of FIG. 3A.

Referring to FIGS. 3A and 3B, schematic diagrams depicting a portion of a light emitting device in accordance with a second embodiment of the present disclosure are shown. The difference between the second embodiment and the first embodiment is in the components of the offset assembly, and the rest are similar or will not be repeated.

As shown in FIG. 3A, an offset assembly 21 includes a polarizing beam splitter (PBS) 20, two ¼ wave plates 21$a$ and 21$b$, and two reflecting mirrors 22$a$ and 22$b$.

In an embodiment, the PBS 20 has a first surface 20$a$ and a second surface 20$b$ opposite to the first surface 20$a$, the two ¼ wave plates 21$a$ and 21$b$ are provided at the sides of the first surface 20$a$ and the second surface 20$b$, respectively, and the two reflecting mirrors 22$a$ and 22$b$ are provided at the sides of the two ¼ wave plates 21$a$ and 21$b$, respectively.

In use, a light beam L1 of a light source 10, which is an S-polarized light, is incident on and reflected by the first surface 20$a$ of the PBS 20, and passes through the ¼ wave plate 21$a$ at the side of the first surface 20$a$. The light beam L1 is then incident on and reflected by the reflecting mirror 22$a$, and passes through the ¼ wave plate 21$a$ at the side of the first surface 20$a$ once again, which is now a P-polarized light (light beam L2). As a result, the light beam L2 passes through the first surface 20$a$ and the second surface 20$b$ of the PBS 20. Thereafter, the light beam L2 (P-polarized light) passes through the ¼ wave plate 21$b$ at the side of the second surface 20$b$, is reflected by the reflecting mirror 22$b$, and passes through the ¼ wave plate 21$b$ at the side of the second surface 20$b$ once again, which now returns to a S-polarized light (light beam L3). As such, the light beam L3 is reflected and outputted by the second surface 20$b$ of the PBS 20.

Therefore, using the high reflectivity characteristic of the PBS 20 to S-polarized light and the high transmittance characteristic of the PBS 20 to P-polarized light, the polarization of the light beam L1 is adjusted, such that the light beam L3 is reflected and outputted by the second surface 20$b$ of the PBS 20, thereby producing controllable and arbitrary offset locations.

Figure 3C:
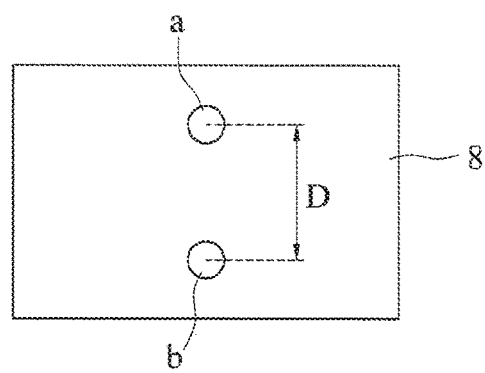
FIG. 3C is a schematic diagram depicting the result of the light beam of FIG. 3A on a target.

Furthermore, as shown in FIG. 3B, the angle of the PBS 20 is adjusted in a clockwise direction using the galvo motor of the control-manipulating mechanism 12, so that the light beam L3 is offset in a parallel manner (e.g., becomes a light beam L4 after offset). This allows high speed control (for example, the revolution per minute of the motor is greater than 20,000). More specifically, the initial location of the PBS 20 is indicated by dashed lines (or as shown in FIG. 3A), and the PBS 20 is rotated by an offset angle ±θ by the galvo motor in a clockwise or anticlockwise direction. Thus, a parallel offset distance D of the light beam L3 is 2(D1+D2) tan(2θ), wherein D1 is the distance from the reflecting mirror 22$a$ at the side of the first surface 20$a$ to the PBS 20, and D2 is the distance from the reflecting mirror 22$b$ at the side of the second surface 20$b$ to the PBS 20. In an embodiment, if the offset angle θ of the PBS 20 is one degree and the length of the offset assembly 21 is 86 mm (i.e., D1 and D2 are 43 mm each), D=2(43+43)tan(2·1)=6.006 mm, so that the light beam L3 is offset in a parallel manner by 6.006 mm to become the lower light beam L4 shown in FIG. 3B. In other words, an initial point a shown in FIG. 3C (on the opening of the target 8 on which the light beam L3 focuses) is shifted to an offset point b (on the opening of the target 8 on which the offset light beam L4 focuses). It can be appreciated that if the galvo motor rotates the PBS 20 in an anticlockwise direction, the light beam L3 will be shifted upwards, becoming another light beam L5, for example.

Moreover, from the above equation, it can be seen that the parallel offset distance D is related to the offset angle θ of the PBS 20. Therefore, in actual implementations (e.g., a drilling process), when the planning method of the PLC of the control-manipulating mechanism 12 (i.e., the association equation of the moving distance of the light beam (e.g., the parallel offset distance D) and the inclination of the wall of the opening (i.e., taper angle of the opening)) is used, the distance of the light beam to be shifted is determined, and a required offset angle θ can be derived by plugging in the value to be shifted (the parallel offset distance D), which allows the PLC to control the galvo motor, which in turns rotates the PBS 20 by the desired angle.

Using the offset assembly 21 in combination with the control-manipulating mechanism 12, not only the offset of the light beam L3 can be controlled, but the control speed is high. Therefore, the light emitting device according to the present disclosure is capable of arbitrarily adjusting the taper angles of an opening, allowing it to be used in the manufacturing of holes of any shapes.

Furthermore, the offset assembly 21 is small in size, therefore allowing the light emitting device to be minimized.

Figure 4:
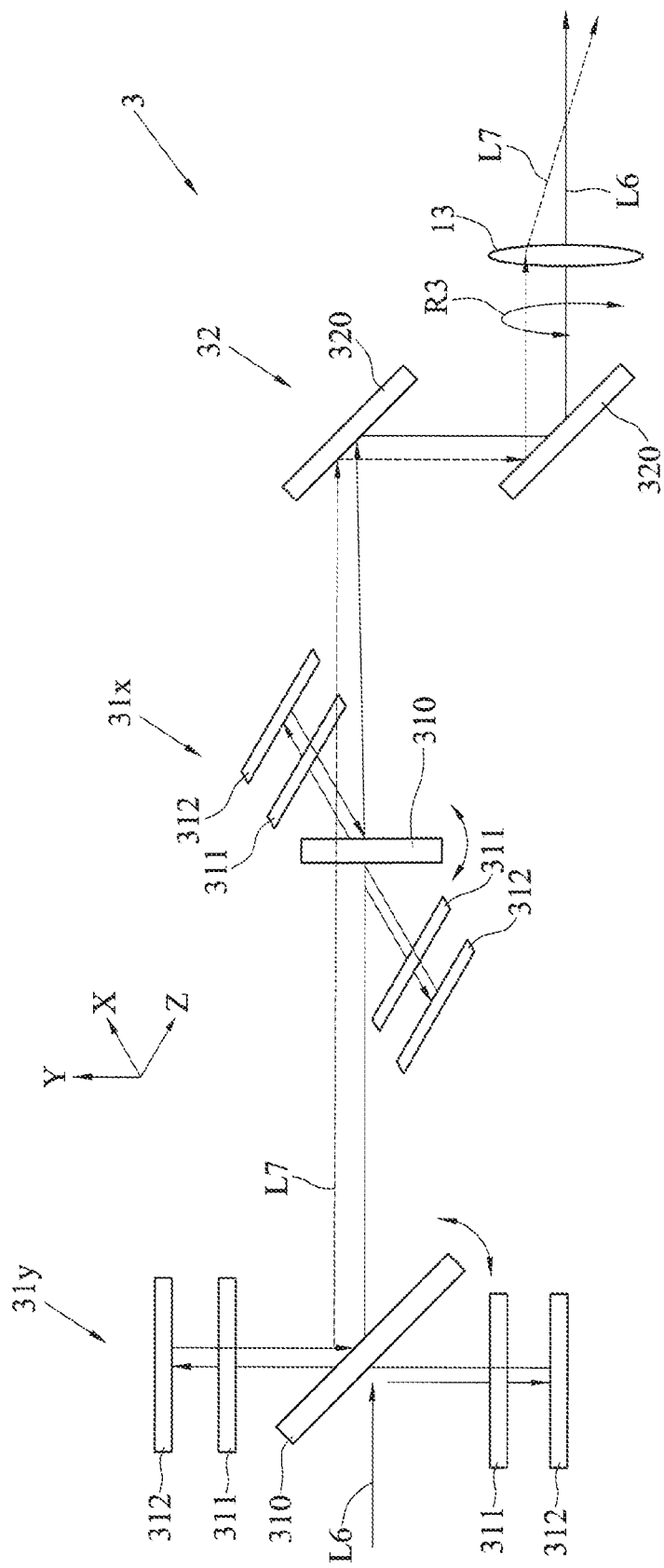
FIG. 4 is a schematic diagram depicting a light emitting device in accordance with a third embodiment of the present disclosure.

FIG. 4 is a schematic diagram depicting a light emitting device 3 in accordance with a third embodiment of the present disclosure. The difference between the third embodiment and the first embodiment is in the deployment of the offset assembly, the rest are similar or the same and will not be repeated.

As shown in FIG. 4, the light emitting device 3 includes at least two sets of offset assemblies 31x and 31y and a scanning assembly 32.

The offset assemblies 31x and 31y may adopt the same structure as the offset assembly 21 in the second embodiment, and each include a PBS 310, two ¼ wave plates 311 and two reflecting mirrors 312 to adjust the rotational angle of the PBS 310 using the galvo motor of the control-manipulating mechanism 12, wherein one set of offset assembly 31y is used for offsetting the light beam in a y-axis direction, while the other set of offset assembly 31x is used for offsetting the light beam in an x-axis direction.

In an embodiment, the scanning assembly 32 is a galvanometer-type scanner, for example, a two dimensional scanner such as a finite-state machine (FSM) scanner or a XY scanner. The scanning assembly 32 includes two vertically arranged guide reflecting mirrors 320. There are numerous types of scanning assembly 32, and the present disclosure is not limited to the above. For example, the scanning assembly 32 can be a one dimensional scanner.

In use, a light beam L6 of a light source 10 passes through the two sets of offset assemblies 31x and 31y, and is guided to the focusing assembly 13 by the guide reflecting mirrors 320 of the scanning assembly 32 to be focused on a target. If the present disclosure is applied in a drilling process, the inclination angle of a tapered surface of an opening can be adjusted by the two offset assemblies 31x and 31y (i.e., the taper angle of the opening, referring to the second embodiment for descriptions, such as a light beam L7 after adjustment shown as a dashed line in FIG. 4), and with help of the scanning assembly 32 and the PLC, an offset path R3 of the light beam L6 can be controlled, which is shown as a circular path in the diagram. However, in other embodiments, the offset path R3 can be any arbitrary path, e.g., with a shape of a square, a triangle or a polygon or curved paths. The light emitting device 3 according to the present disclosure is applicable to laser manufacturing process of complicated parts.

The light emitting device according to the present disclosure adopts two sets of independent offset assemblies 31x and 31y to offset the light beam L6 in the x and y axes, respectively. Furthermore, with the addition of the scanning assembly 32, controllable and arbitrary taper angles can be created on the XY planes and the focusing optical axis.

In conclusion, the light emitting method and the light emitting device according to the present disclosure allow the path of the light beam to be adjusted through the combination of the control-manipulating mechanism and the offset assembly. Thus, when applied to the laser drilling process, the present disclosure is capable of quickly producing controllable tapered holes or straight holes of any shapes as demanded, and with a size greater than, equal to or less than 50 microns in diameter.

In addition, the galvo motor of the control-manipulating mechanism 12 can be replaced by other similar motors, such as a voice coil motor or a torque motor, and the present disclosure is not limited as such.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A light emitting method, comprising:
passing a light beam forming an opening through at least an offset assembly and a focusing assembly in sequence; and
making the light beam generate an offset by a control-manipulating mechanism to actuate the offset assembly, wherein the control-manipulating mechanism has a programmable logic controller planning a displacement path of the offset assembly, based on a moving distance of the light beam and an inclination angle of a wall of the opening, to displace the offset assembly and control an offset path of the light beam.

2. The light emitting method of claim 1, wherein the light beam is laser.

3. The light emitting method of claim 1, wherein the light beam is offset in a parallel manner.

4. The light emitting method of claim 1, wherein the displacement path of the offset assembly includes a moving distance variation or a rotational angle variation.

5. The light emitting method of claim 1, wherein the offset assembly includes:
a beam splitter;
a wave plate provided above the beam splitter; and
a reflecting mirror provided above the wave plate, wherein the light beam is incident on and reflected by the beam splitter, passes through the wave plate, is reflected by the reflecting mirror, passes through the wave plate once again, and is reflected and outputted by the beam splitter.

6. The light emitting method of claim 1, wherein the control-manipulating mechanism includes a galvo motor rotating the offset assembly by an offset angle related to an offset distance of the light beam.

7. The light emitting method of claim 1, wherein the light beam passes through two sets of the offset assemblies, one of which is used for offsetting the light beam in an X-direction, and the other of which is used for offsetting the light beam in a Y-direction perpendicular to the X-direction.

8. The light emitting method of claim 1, further comprising guiding, by a scanning assembly, the light beam from the offset assembly to the focusing assembly.

9. A light emitting device, comprising:
   an offset assembly configured for a light beam to pass therethrough, wherein the light beam is configured for forming an opening;
   a focusing assembly configured for receiving the light beam from the offset assembly; and
   a control-manipulating mechanism configured for actuating the offset assembly to offset the light beam, wherein the control-manipulating mechanism has a programmable logic controller planning a displacement path of the offset assembly, based on a moving distance of the light beam and an inclination angle of a wall of the opening, to displace the offset assembly and control an offset path of the light beam.

10. The light emitting device of claim 9, wherein the light beam is laser, and the light beam is offset in a parallel manner.

11. The light emitting device of claim 9, wherein the offset assembly includes:
    a beam splitter;
    a wave plate provided above the beam splitter; and
    a reflecting mirror provided above the wave plate.

12. The light emitting device of claim 9, wherein the control-manipulating mechanism includes a galvo motor rotating the offset assembly by an offset angle related to an offset distance of the light beam.

13. The light emitting device of claim 9, wherein the light beam passes through two sets of the offset assemblies, one of which is used for offsetting the light beam in an X-direction, and the other of which is used for offsetting the light beam in a Y-direction perpendicular to the X-direction.

14. The light emitting device of claim 9, further comprising a scanning assembly provided between the offset assembly and the focusing assembly and configured for guiding the light beam from the offset assembly to the focusing assembly.

15. The light emitting device of claim 14, wherein the scanning assembly is configured for controlling the offset path of the light beam.

16. The light emitting device of claim 15, wherein the offset path is a circular, square, triangular, polygonal or curved path to be used in a laser manufacturing process of complicated parts.

* * * * *